United States Patent [19]

Foster et al.

[11] Patent Number: 5,125,985
[45] Date of Patent: Jun. 30, 1992

[54] PROCESSING ZIRCONIUM ALLOY USED IN LIGHT WATER REACTORS FOR SPECIFIED CREEP RATE

[75] Inventors: John P. Foster, Monroeville, Pa.; Samuel A. Worcester, Butte, Mont.; Robert J. Comstock, Penn Township, Westmoreland County, Pa.

[73] Assignee: Westinghouse Electric Corp., Pittsburgh, Pa.

[21] Appl. No.: 711,561

[22] Filed: May 30, 1991

Related U.S. Application Data

[63] Continuation of Ser. No. 579,501, Sep. 10, 1990, abandoned, which is a continuation-in-part of Ser. No. 465,665, Jan. 16, 1990, abandoned, which is a continuation-in-part of Ser. No. 399,652, Aug. 28, 1989, abandoned.

[51] Int. Cl.⁵ ............................................. C22C 16/00
[52] U.S. Cl. .................................. 148/672; 148/421; 420/422
[58] Field of Search .................. 148/11.5 F, 12.7 B, 148/133, 421; 420/422

[56] References Cited

U.S. PATENT DOCUMENTS

| | | | |
|---|---|---|---|
| 4,678,521 | 7/1987 | Yoshida et al. | 148/11.5 F |
| 4,689,091 | 8/1987 | Yoshida et al. | 148/11.5 F |
| 4,717,427 | 1/1988 | Morel et al. | 148/11.5 F |
| 4,764,223 | 8/1988 | Charquet et al. | 148/11.5 F |
| 4,879,093 | 11/1989 | Garde | 148/11.5 F |

Primary Examiner—Upendra Roy
Attorney, Agent, or Firm—Z. L. Dermer

[57] ABSTRACT

This invention is for the processing of a somewhat broader range of compositions, including ZIRLO material. It controls creep rate in an alloy having, by weight percent, 0.5–2.0 niobium, 0.7–1.5 tin, 0.07–0.28 of at least one of iron, nickel and chromium and up to 220 ppm carbon, and the balance essentially zirconium. The method is of a type which utilizes subjecting the material to a post extrusion anneal, a series of intermediate area reductions and intermediate recrystallization anneals, with one of the intermediate recrystallization anneals possibly being a late stage beta-quench, a final pass area reduction, and a final stress relief anneal. The creep rate is controlled to about the desired amount per hour by the use of an average intermediate recrystallization annealing temperature and a final pass area reduction combination selected from the designated area of a designated figure, with the figure being selected based on whether the post extrusion anneal was an alpha or a beta anneal; on whether the final anneal was a stress relief anneal or a recrystallization anneal, and whether or not a late stage beta-quench was utilized, and the desired creep rate range. The method may also comprise subjecting the material to an alpha post extrusion anneal and a final stress relief anneal, and controlling the creep rate by the use of certain intermediate recrystallization annealing temperatures and final pass true area reductions.

9 Claims, 17 Drawing Sheets

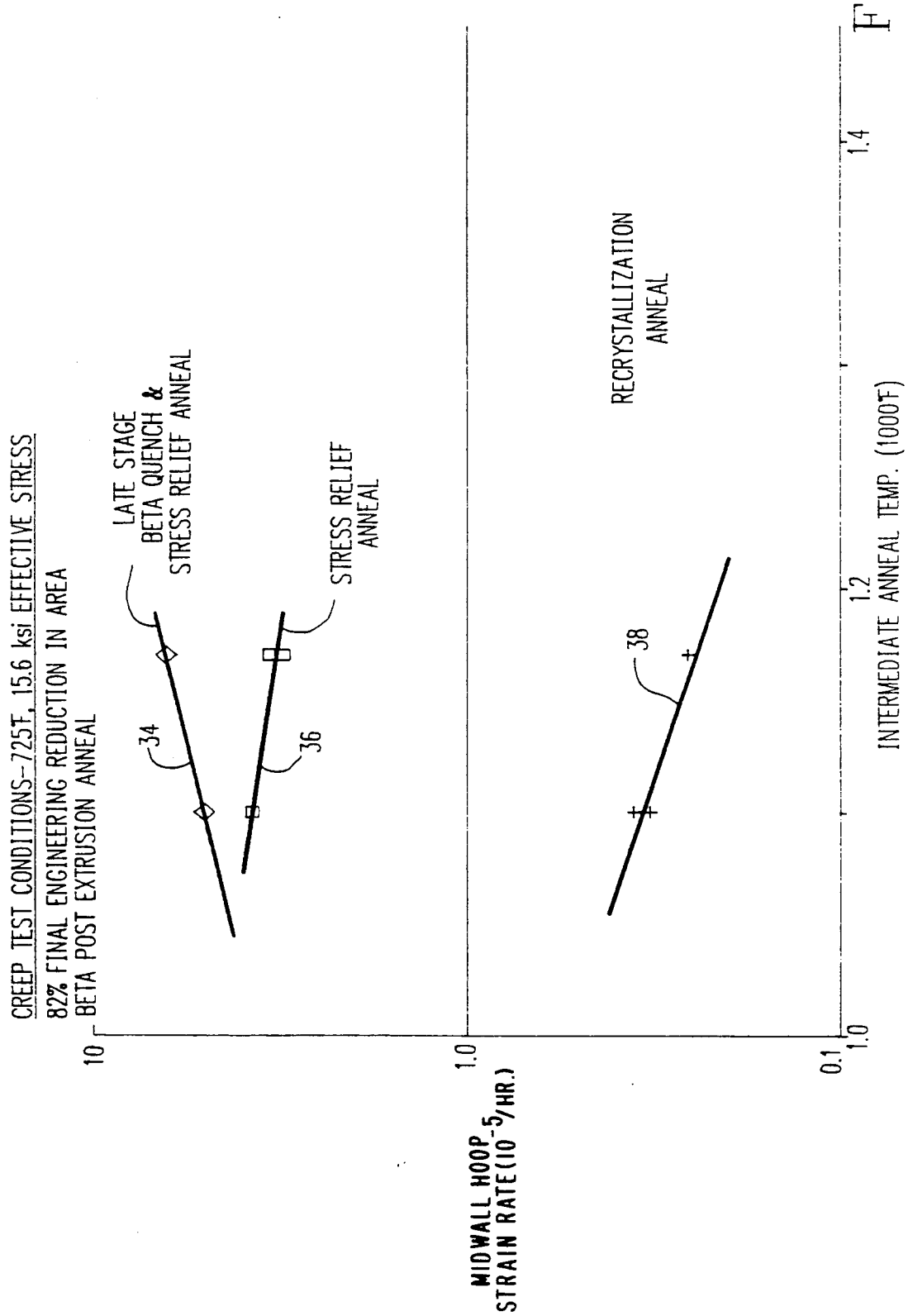

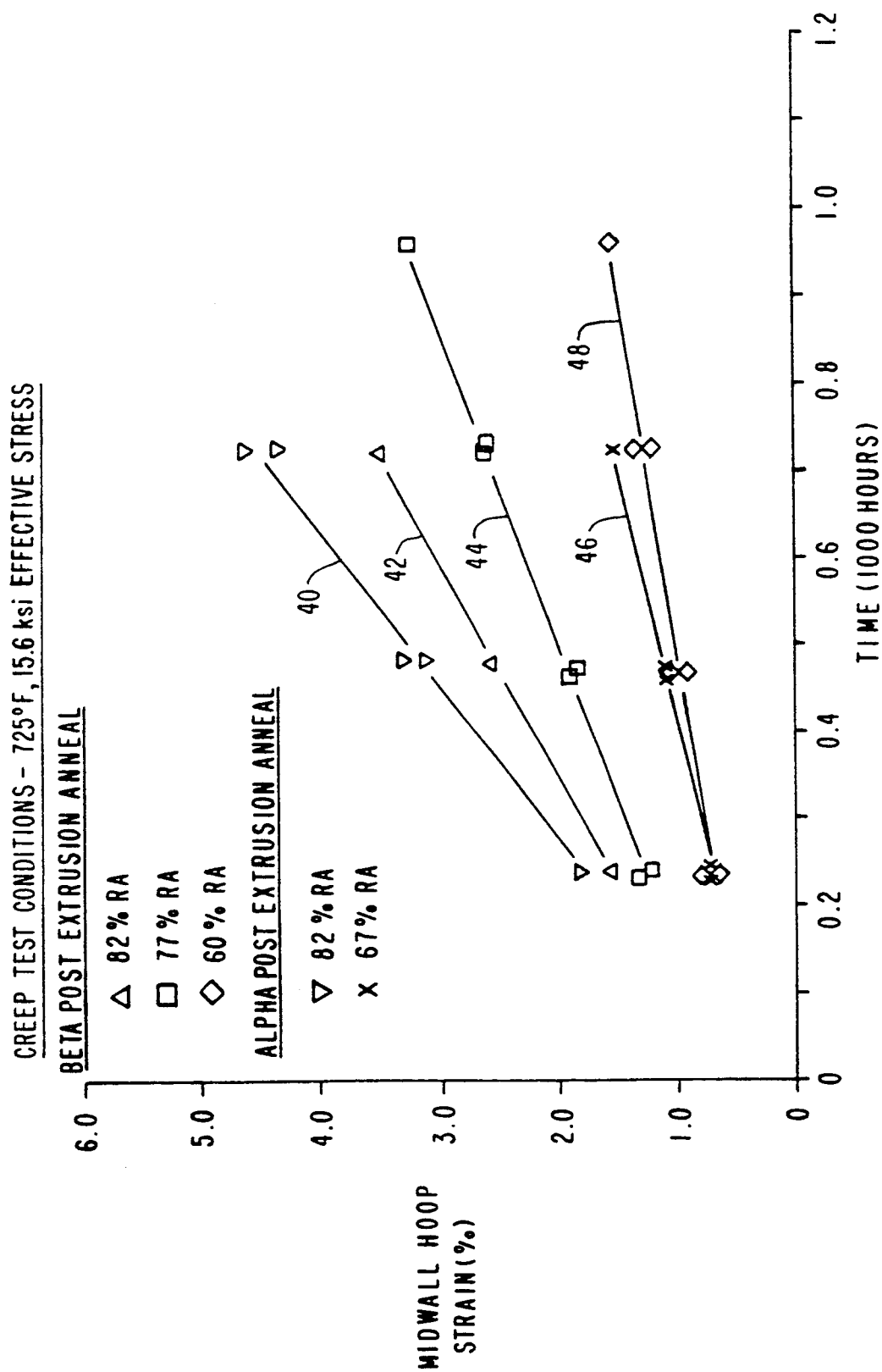

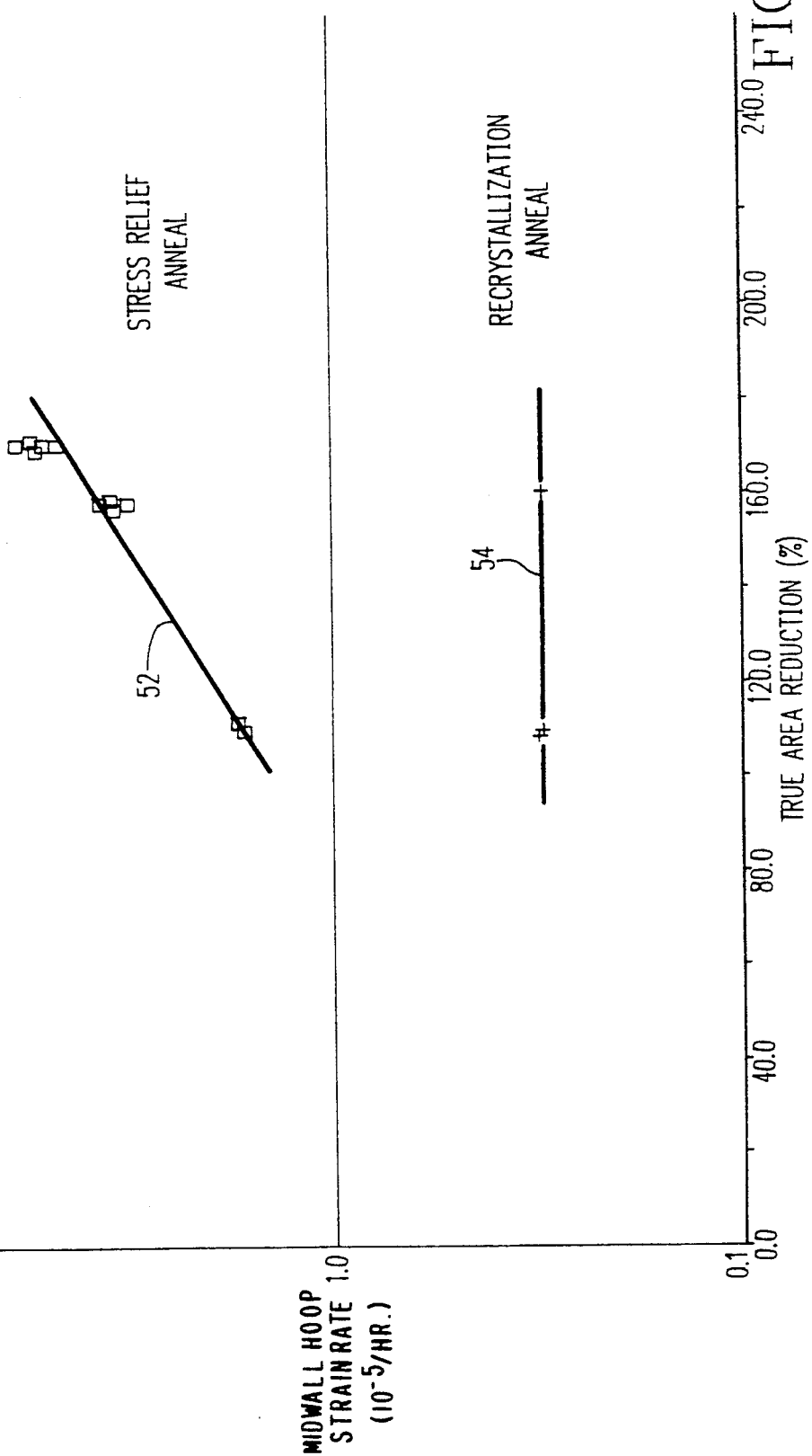

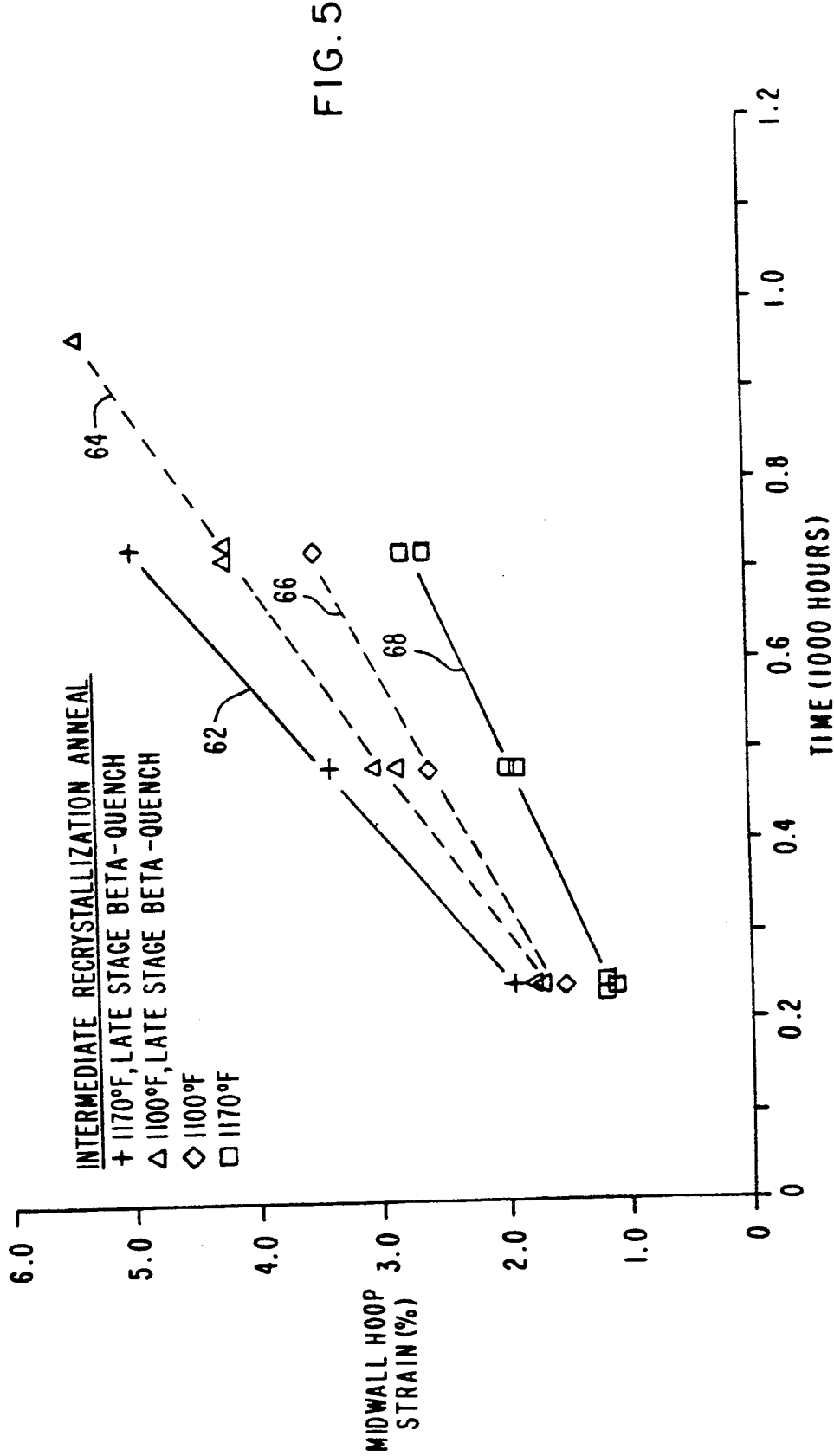

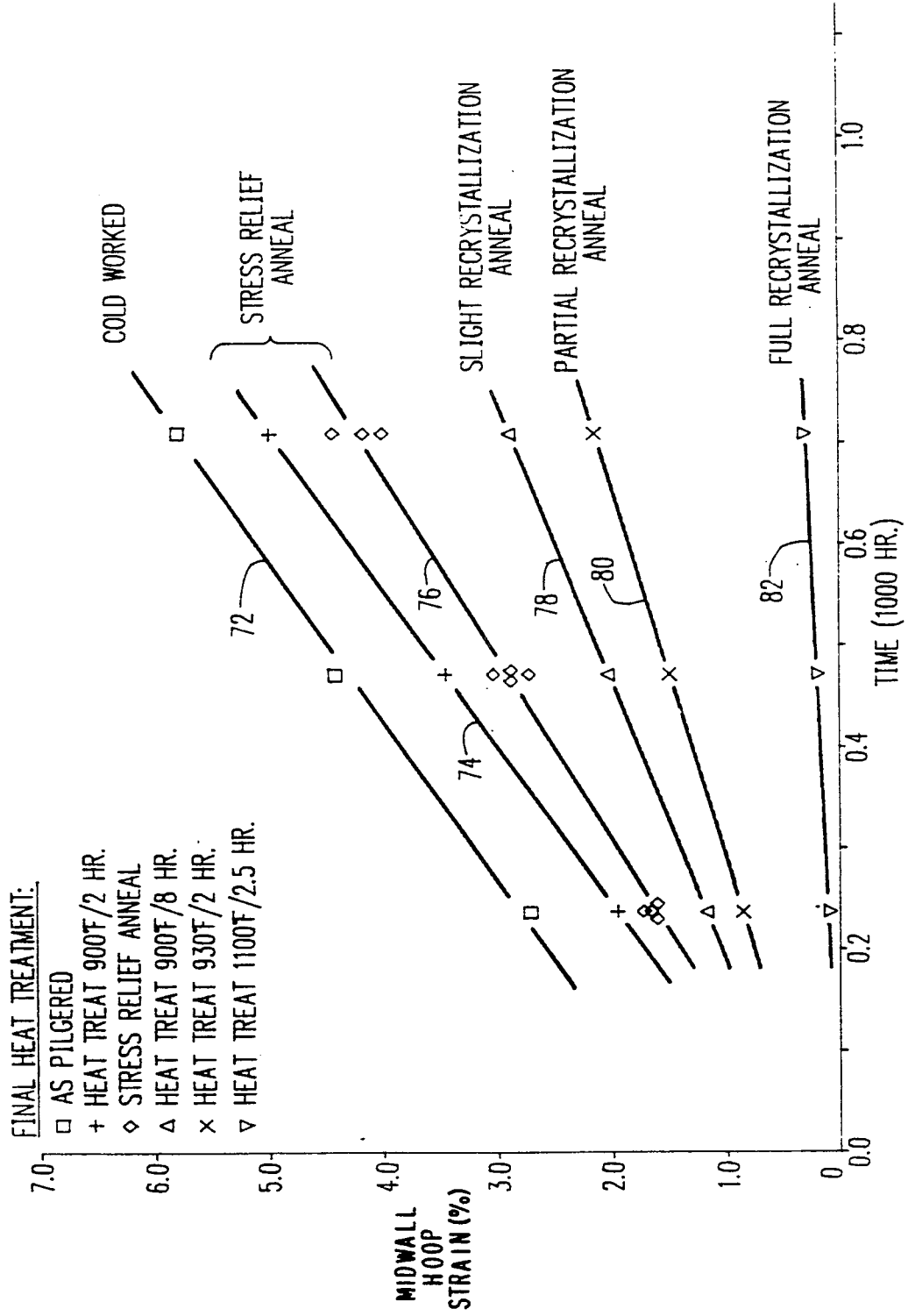

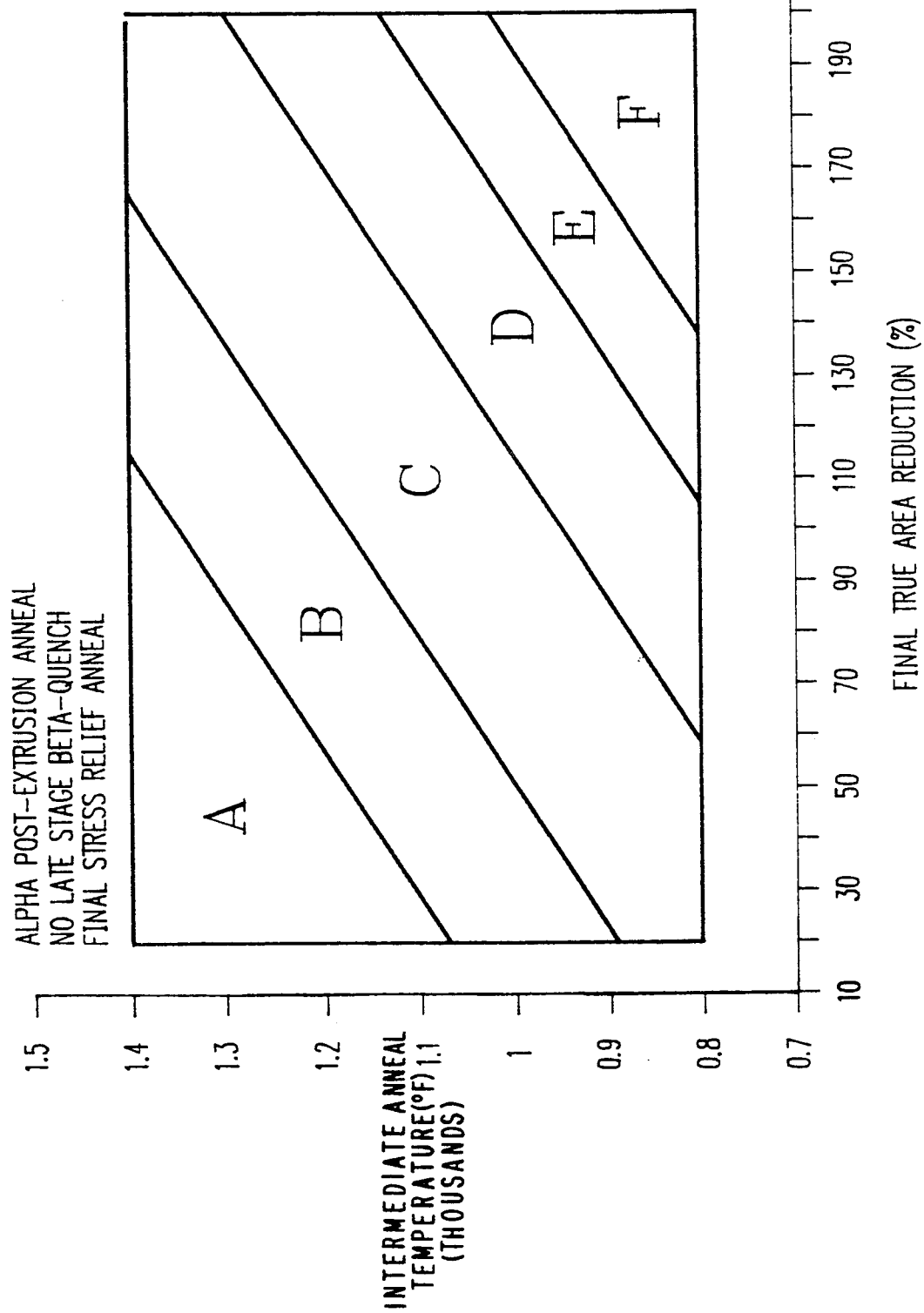

PROCESSING ZIRCONIUM ALLOY USED IN LIGHT WATER REACTORS FOR SPECIFIED CREEP RATE

CROSS REFERENCE TO RELATED APPLICATIONS

This application is a continuation of application Ser. No. 579,501, filed Sep. 10, 1990.

This application is a continuation-in-part of copending U.S. patent application Ser. No. 07/465,665 filed Jan. 16, 1990, to be abandoned, which is a continuation-in-part of U.S. patent application Ser. No. 07/399,652, filed Aug. 28, 1989, now abandoned.

This application is related to a co-pending application Ser No. 07/399,662 filed Aug. 28, 1989, entitled "ZIRLO Material for Light Water Reactor Applications" and assigned to the same assignee. That copending application provides composition ranges for maintaining corrosion resistance while allowing recycling of Zircaloy-4 and Zircaloy-2 material.

BACKGROUND OF THE INVENTION

The invention relates to a method of processing zirconium based material and more particularly to a method of controlling creep in a zirconium-niobium-tin-iron alloy.

In the development of nuclear reactors, such as pressurized water reactors and boiling water reactors, fuel designs impose significantly increased demands on all of the core components, such as cladding, grids, guide tubes, and the like. Such components are conventionally fabricated from the zirconium-based alloys, Zircaloy-2 and Zircaloy-4. Increased demands on such components will be in the form of longer required residence times and thinner structural members, both of which cause potential corrosion and/or hydriding problems. These increased demands have prompted the development of alloys that have improved corrosion and hydriding resistance, as well as fabricability and mechanical properties that are typical of the conventional Zircaloys. One such class of materials are the zirconium alloys containing zirconium, niobium, tin, and a third element, such as a zirconium alloy containing 1 percent by weight niobium, 1 percent by weight tin, and at least 0.15 percent by weight iron. Alloys of zirconium, niobium, tin and iron which have been proposed include those of Castaldelli et al. (Long-term Test Results of Promising New Zirconium Alloys," *Zirconium in the Nuclear Industry*, 5th Conference, ASTM STP 754, 1982, pages 105–126) who tested a zirconium 1Nb-1Sn-0.5 Fe alloy and mention a zirconium 1Nb-1Sn alloy with 0.15–0.20 Fe, and an alloy known as Ozhennite 0.5, which comprises 0.18–0.22 wt. % Sn, 0.09–0.11 wt. % Nb, 0.09–0.11 wt. % Fe, and 0.09–0.11 wt. % Ni, all alloyed with Zr.

U.S. Pat. No. 4,649,023, issued Mar. 10, 1987 (hereinafter "the ZIRLO patent") is a composition and process patent, generally covering a composition range of 0.5–2.0 w/o (weight percent) Nb, 0.9–1.5 w/o Sn, and 0.09–0.11 w/o of third element selected from Fe, Cr, Mo, V, Cu, Ni and W, (or presumably 0.09–0.11 w/o of mixtures of more that one such "third element") and generally with annealing temperatures between cold working stages in the range of 932°–1202° F. That patent does not address controlling thermal creep.

Different creep rates are desirable for different applications. Low creep rates are generally thought to be desirable for spacer material and water rods, for example, but it may be desirable for higher creep in fuel rods to compensate for the fuel pellet expansion which occurs over the operating life of the fuel. There has never, heretofore, been a straightforward method of controlling creep in such alloys.

SUMMARY OF THE INVENTION

It has been discovered that certain zirconium-niobium-tin-iron alloys allow the control of thermal creep by process modifications. This invention is for the processing of a range of compositions, which is a somewhat broader range than, but includes, the ranges of the ZIRLO patent.

This is a method for controlling creep rate in an alloy having, by weight percent, 0.5–2.0 niobium, 0.7–1.5 tin, 0.07–0.28 of at least one of iron, nickel and chromium and up to 220 ppm carbon, and the balance essentially zirconium. The method is of a type which utilizes subjecting the material to a post extrusion anneal, a series of intermediate area reductions and intermediate recrystallization anneals, with one of the intermediate recrystallization anneals possibly being a late stage beta-quench, a final-pass area reduction, and a final stress relief anneal. The creep rate is controlled to about the desired amount by the use of an average intermediate recrystallization annealing temperature and a final-pass true area reduction combination selected from a designated area of a designated figure, with the figure being selected based on whether the post extrusion anneal was an alpha or a beta anneal; on whether the final anneal was a stress relief anneal or a recrystallization anneal, on whether or not a late stage beta-quench was utilized, and the desired creep rate range.

Generally the figures are either for a final anneal which is either a stress relief anneal or for a recrystallization anneal, and if partially recrystallizing final anneal is used an adjusted creep is calculated such that using the adjusted creep and an appropriate recrystallized figure, will indicate the average intermediate recrystallization annealing temperature and a final-pass true area reduction combination to give the desired creep for that degree of recrystallization. When fully recrystallized, the figures can be used directly (i.e. the adjusted creep is equal to the actual creep).

The method comprises:

a) subjecting the material to an alpha post extrusion anneal and a final stress relief anneal, and not using a late stage beta-quench, and controlling the creep rate to about 0.000,001–0.000,004 per hour by the use of an average intermediate recrystallization annealing temperature and a final true area reduction combination selected from area A of FIG. 7; or controlling the creep rate to about 0.000,004–0.000,010 per hour by the use of an average intermediate recrystallization annealing temperature and a final true area reduction combination selected from area B of FIG. 7; or controlling the creep rate to about 0.000,010–0.000,030 per hour by the use of an average intermediate recrystallization annealing temperature and a final true area reduction combination selected from area C of FIG. 7; or controlling the creep rate to about 0.000,030–0.000,070 per hour by the use of an average intermediate recrystallization annealing temperature and a final true area reduction combination selected from D area of FIG. 7; or controlling the creep rate to about 0.000,070–0.000,140 per hour by the use of an average intermediate recrystallization annealing temperature and a final true area reduction combination selected from area E of FIG. 7, or controlling the creep rate to about 0.000,140–0.000,200 per hour by the use of an average intermediate recrystallization annealing temperature and a final true area reduction combination selected from area F of FIG. 7; or b) subjecting the material to an alpha post extrusion anneal and a final stress relief anneal, and using a late stage beta-quench, and controlling the creep rate to about 0.000,001–0.000,004 per hour by the use of an average intermediate recrystallization annealing temperature and a final true area reduction combination selected from area A of FIG. 8; or controlling the creep rate to about 0.000,004–0.000,010 per hour by the use of an average intermediate recrystallization annealing temperature and a final true area reduction combination selected from area B of FIG. 8; or controlling the creep rate to about 0.000,010–0.000,030 per hour by the use of an average intermediate recrystallization annealing temperature and a final true area reduction combination selected from area C of FIG. 8; or controlling the creep rate to about 0.000,030–0.000,070 per hour by the use of an average intermediate recrystallization annealing temperature and a final true area reduction combination selected from area D of FIG. 8; or controlling the creep rate to about 0.000,070–0.000,140 per hour by the use of an average intermediate recrystallization annealing temperature and a final true area reduction combination selected from area E of FIG. 8; or controlling the creep rate to about 0.000,140–0.000,200 per hour by the use of an average intermediate recrystallization annealing temperature and a final true area reduction combination selected from area F of FIG. 8; or c) subjecting the material to an alpha post extrusion anneal and a final at least partial recrystallization anneal, and not using a late stage beta-quench, and controlling the adjusted creep rate to about 0.000.001–0.000,004 per hour by the use of an average intermediate recrystallization annealing temperature and a final true area reduction combination selected from area A of FIG. 9; or controlling the creep rate to about 0.000,004–0.000,010 per hour by the use of an average intermediate recrystallization annealing temperature and a final true area reduction combination selected from area B of FIG. 9; or d) subjecting the material to an alpha post extrusion anneal and a final at least partial recrystallization anneal, and using a late stage beta-quench, and controlling the adjusted creep rate to about 0.000,001–0.000,004 per hour by the use of an average intermediate recrystallization annealing temperature and a final true area reduction combination selected from area A of FIG. 10; or controlling the creep rate to about 0.000,004–0.000,010 per hour by the use of an average intermediate recrystallization annealing temperature and a final true area reduction combination selected from area B of FIG. 10; or controlling the creep rate to about 0.000,010–0.000,030 per hour by the use of an average intermediate recrystallization annealing temperature and a final true area reduction combination selected from area C of FIG. 10; or e) subjecting the material to a beta post extrusion anneal and a final at least partial recrystallization anneal, and not using a late stage beta-quench and controlling the adjusted creep rate to about 0.000,000,04–0.000,000,1 per hour by the use of an average intermediate recrystallization annealing temperature and a final true area reduction combination selected from area A of FIG. 11; or controlling the creep rate to about 0.000,000,1–0.000,000,4 per hour by the use of an average intermediate recrystallization annealing temperature and a final true area reduction combination selected from area B of FIG. 11; or controlling the adjusted creep rate to about 0.000,000,4–0.000,001 per hour by the use of an average intermediate recrystallization annealing temperature and a final true area reduction combination selected from area C of FIG. 11; or controlling the creep rate to about 0.000,001–0.000,004 per hour by the use of an average intermediate recrystallization annealing temperature and a final true area reduction combination selected from area D of FIG. 11; or controlling the creep rate to about 0.000,004–0.000,010 per hour by the use of an average intermediate recrystallization annealing temperature and a final true area reduction combination selected from area E of FIG. 11; or controlling the creep rate to about 0.000,010–0.000,030 per hour by the use of an average intermediate recrystallization annealing temperature and a final true area reduction combination selected from area F of FIG. 11; or f) subjecting the material to a beta post extrusion anneal and a final stress relief anneal, and not using a late stage beta-quench and controlling the adjusted creep rate to about 0.000,001–0.000,004 per hour by the use of an average intermediate recrystallization annealing temperature and a final true area reduction combination selected from area A of FIG. 12; or controlling the creep rate to about 0.000,004–0.000,010 per hour by the use of an average intermediate recrystallization annealing temperature and a final true area reduction combination selected from area B of FIG. 12; or controlling the creep rate to about 0.000,010–0.000,030 per hour by the use of an average intermediate recrystallization annealing temperature and a final true area reduction combination selected from area C of FIG. 12; or controlling the creep rate to about 0.000,030–0.000,070 per hour by the use of an average intermediate recrystallization annealing temperature and a final true area reduction combination selected from area D of FIG. 12; or controlling the creep rate to about 0.000,070–0.000,140 per hour by the use of an average intermediate recrystallization annealing temperature and a final true area reduction combination selected from area E of FIG. 12; or g) subjecting the material to a beta post extrusion anneal and a final stress relief anneal, and using a late stage beta-quench, and controlling the creep rate to about 0.000,004–0.000,010 per hour by the use of an average intermediate recrystallization annealing temperature and a final true area reduction combination selected from area A of FIG. 13; or controlling the creep rate to about 0.000,010–0.000,030 per hour by the use of an average intermediate recrystallization annealing temperature and a final true area reduction combination selected from area B of FIG. 13; or controlling the creep rate to about 0.000,030–0.000,070 per hour by the use of an average intermediate recrystallization annealing temperature and a final true area reduction combination selected from area C of FIG. 13; or controlling the creep rate to about 0.000,070–0.000,140 per hour by the use of an average intermediate recrystallization annealing temperature and a final true area reduction combination selected from area D of FIG. 13; or h) subjecting the material to a beta post extrusion anneal and a final at least partial recrystallization anneal, and using a late stage beta-quench and controlling the adjusted creep rate to about 0.000,000,4–0.000,001 per hour by the use of an average intermediate recrystallization annealing temperature and a final true area reduction combination selected from area A of FIG. 14; or controlling the adjusted creep rate to about 0.000,001–0.000,004 per hour by the use of an average intermediate recrystallization annealing temperature and a final true area reduction combination selected from area B of FIG. 14; or controlling the adjusted creep rate to about 0.000,004–0.000,010 per hour by the use of an average intermediate recrystallization annealing temperature and a final true area reduction combination selected from area C of FIG. 14; or controlling the creep rate to about 0.000,010–0.000,030 per hour by the use of an average intermediate recrystallization annealing temperature and a final true area reduction combination selected from area D of FIG. 14.

When the final anneal is at least partially recrystallized, creep rate areas are adjusted before selecting fabrication conditions. In the case of 82% cold worked material, the adjusted creep is equal to the desired creep divided by $$1 + \frac{10.7}{1 + \sqrt{\frac{R}{1-R}}}$$

where R is the fraction of recrystallization and the square root of $[R/(1-R)]$ is calculated.

The method may also comprise subjecting the material to an alpha post extrusion anneal and a final stress relief anneal, and controlling the creep rate by the use of certain ranges of intermediate recrystallization annealing temperatures and final pass true area reductions (the specific ranges depend on whether or not a late stage beta-quench is used).

BRIEF DESCRIPTION OF THE DRAWINGS

The invention as set forth in the claims will become more apparent by reading the following detailed description in conjunction with the accompanying drawings, in which:

FIG. 2B shows the dependence of the creep rate on intermediate anneal temperature in material with a final stress relief anneal (for a beta post extrusion anneal) and a late stage beta quench is utilized and in material with a final recrystallization anneal;

FIG. 3 shows the strong effect of final area reduction (the final pilgering step) with both alpha and beta post extrusion anneals;

FIG. 4A shows the dependence of the creep rate on final area reduction with curves for alpha post extrusion anneals in material both with final stress relief annealing and with final recrystallization annealing;

FIG. 5 shows the effect of beta-quenching when the beta-quench is performed at two reduction steps prior to final size, the material had a beta post extrusion anneal and a final stress relief anneal;

FIG. 6 shows the dependence of the creep rate on final heat treatment with curves with final stress relief annealing, final recrystallization annealing, and final partial recrystallization annealing;

FIGS. 7 through 14 show areas of thermal creep range for combinations of intermediate anneal temperature and final true area reduction with the various figures being related to conditions of post extrusion anneal (alpha or beta), whether of not a late stage beta-quench is utilized, and conditions of final anneal (stress relief, partial recrystallization, or recrystallization)

DESCRIPTION OF THE PREFERRED EMBODIMENT

Figure 1:
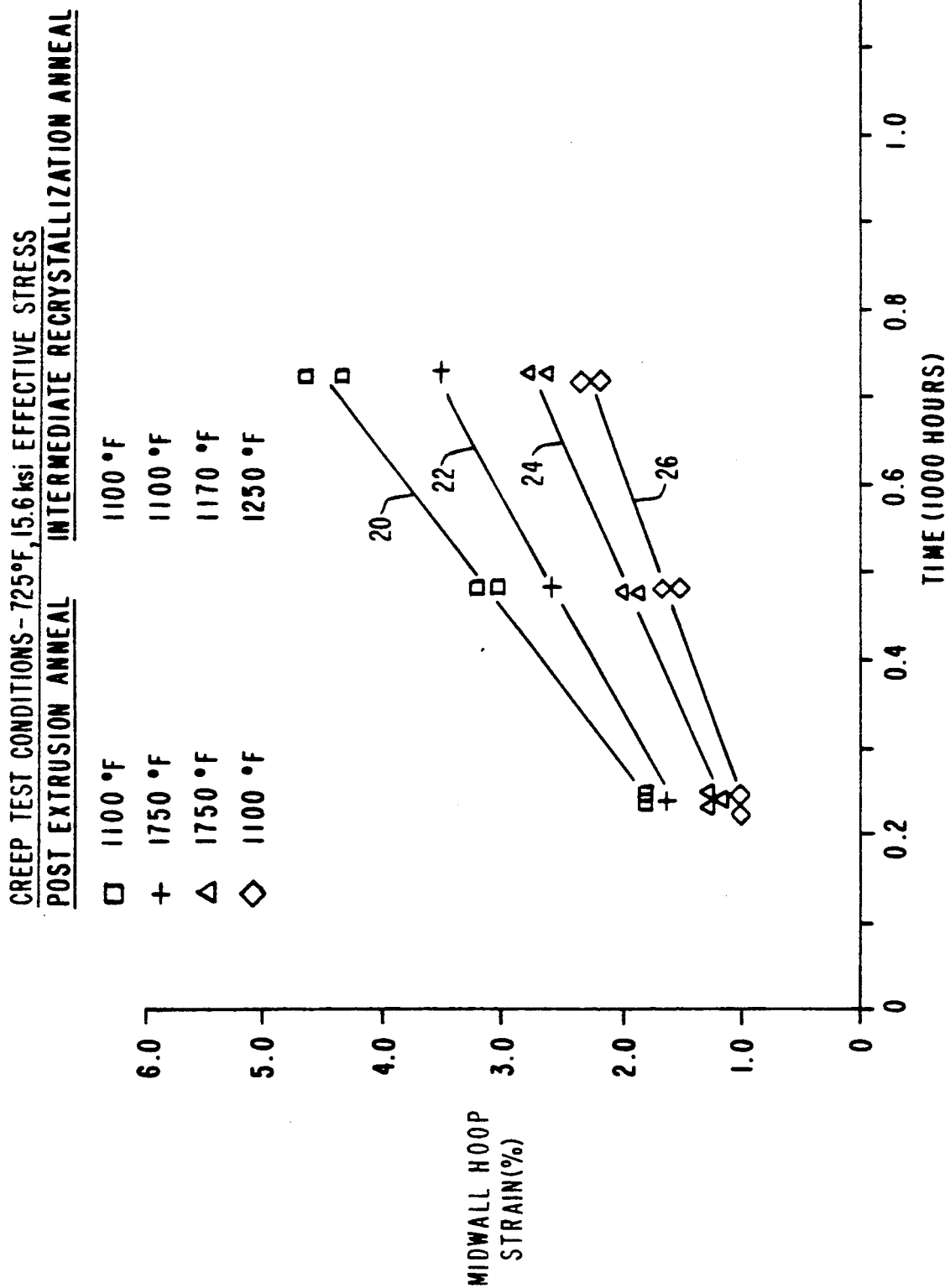
FIG. 1 shows the strong effect of processing temperatures on creep (midwall hoop strain rate, in units of percent, versus time, in units of 1000 hours), with curves for both alpha and beta post extrusion anneals at various intermediate recrystallization temperatures (in material with a final stress relief anneal)

The method consists of first selecting the desired thermal creep behavior and the conditions of post extrusion anneal (alpha or beta), whether or not a late stage beta-quench is utilized, and the conditions of final anneal (stress relief, partial recrystallization, or recrystallization), and then using the appropriate figure to determine the area reduction and intermediate anneal temperature. The figures are generally constructed using the intermediate anneal temperature and area reduction data of FIGS. 1 through 6.

The conditions of post extrusion anneal are, if below about 1600° F., alpha (e.g. 1100° F.); or, if above 1600° F., beta (e.g. 1750° F.), as know in the art. Whether or not a "late stage" beta-quench (between the final reduction and three stages before the final reduction, e.g. two stages back and thus before the last intermediate reduction) is utilized, can also be varied, and such beta-quenching is known in the art. The conditions of final anneal (stress relief, e.g. at 870° F. for about 2 hours; partial recrystallization, e.g. 930° F. for about 2 hours; or recrystallization, 1100° F. for about 2.5 hours), are also known in the art.

The material tested generally had a composition of 0.5–2.0 w/o Nb, 0.9–1.5 w/o Sn, 0.09–0.11 w/o Fe, 20–800 ppm Cr, 20–500 ppm Ni, and 50–220 ppm carbon, with the balance essentially zirconium, however the results are felt to be applicable to the other ZIRLO-type material. The thermal creep of the material can be controlled by process modifications according to the methods described in this disclosure.

When the final anneal is partial recrystallizing, creep rate areas are adjusted before selecting fabrication conditions (if the anneal is fully recrystallizing, the areas can be used as shown, as the adjusted creep will be equal to the desired creep). If the final recrystallization is to be at least partial, in the case of 82% cold worked material, the adjusted creep is equal to the desired creep divided by $$1 + \frac{10.7}{1 + \sqrt{\frac{R}{1-R}}}$$

where R is the fraction of recrystallization and the square root of $[R/(1-R)]$ is calculated. Thus, when the recrystallization is 100%, the denominator approaches the value of 1, and the adjusted creep is equal to the desired creep. When 50% recrystallization is to be used, the denominator is 6.35 and the desired creep is divided by 6.35 to find the adjusted creep, and the adjusted creep is used with the appropriate figure to find average intermediate anneal conditions and final true area reduction conditions which will produce the desired creep with the 50% recrystallization. The degree of partial recrystallization can be determined metallographically, as known in the art.

Note that area reductions of a pilgering pass are given in units both as "engineering reductions in area" (RA) and as "final true area reductions" (in %). The RA is the original area minus the area after reduction divided by the original area, and the "final true area reduction" in percent is 100 times the natural log of the original area divided by the area after reduction.

It is preferred that the same intermediate annealing temperature be used for all intermediate anneals. If varying temperatures are used, the higher temperature anneals affect creep and corrosion. The "average intermediate anneal temperature" is calculated as the root mean square of the varying temperatures.

Note also that, as used herein, the term "creep rate" refers to the steady or linear creep (sometimes called the "secondary creep rate"), and not the initial creep (which is sometimes called the "primary creep").

Figure 2A:
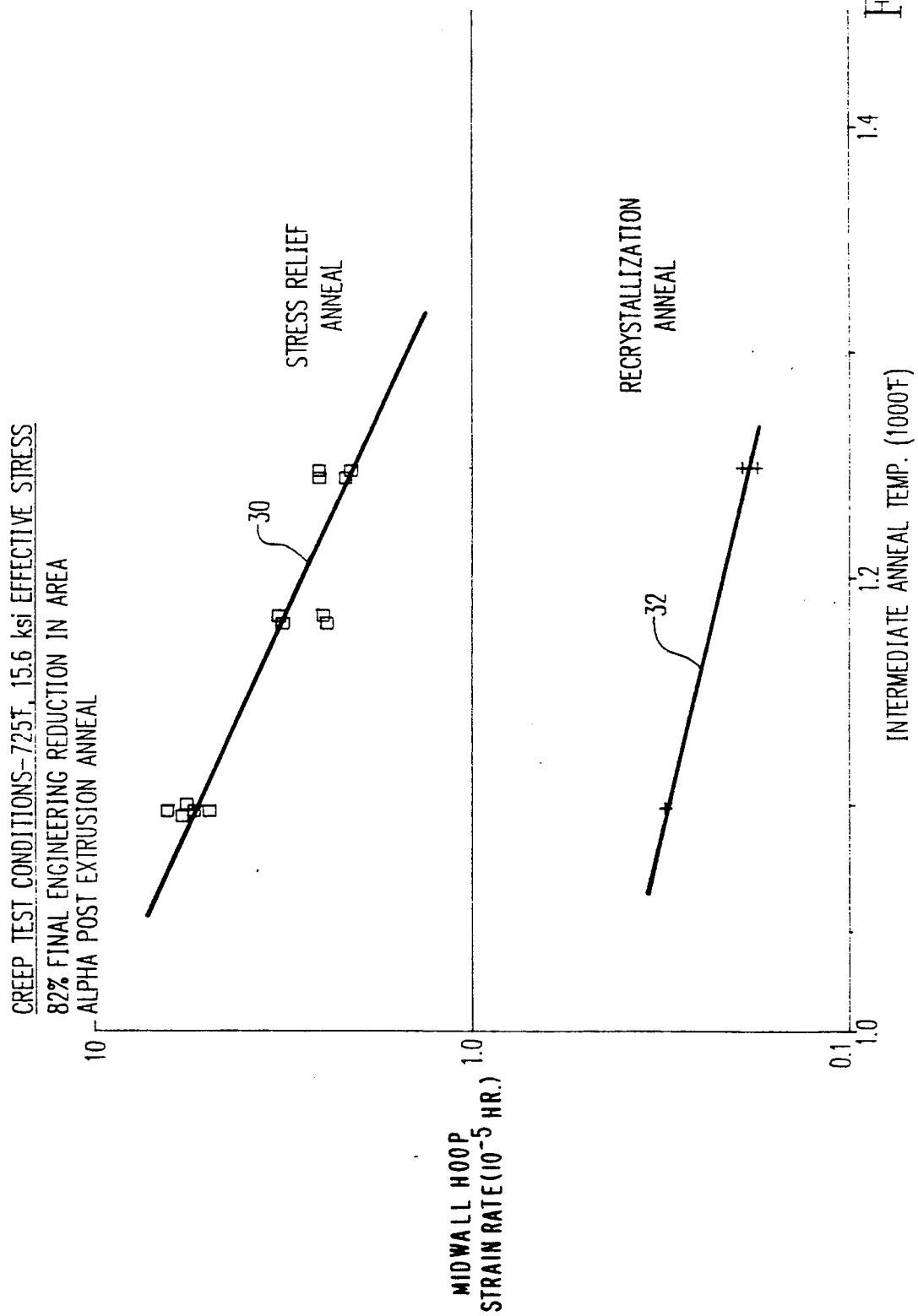
FIG. 2A shows the dependence of the creep rate on intermediate anneal temperature in material with a final stress relief anneal (for an alpha post extrusion anneal) and in material with a final recrystallization anneal.

ZIRLO-type material thermal creep is very sensitive to processing parameters. Curves 20-26 of FIG. 1 show the strong effect of processing temperatures. Curves 22 and 20 show that a decrease in the post-extrusion anneal temperature from 1750° (beta anneal) to 1100° F. (alpha anneal) increased the thermal creep secondary rate by a factor of 1.8. Curves 20 and 26 show that an increase in the intermediate anneal temperature from 1100° to 1250° F. strongly decreased the thermal creep. All of the material presented in FIG. 1 was fabricated into 0.374 inch OD×0.023 inch wall tubing. The dependence of the secondary creep rate on intermediate anneal temperature is presented by Curves 30 (stress relief anneal) and 32 (recrystallization anneal) of FIG. 2A and by Curves 34 (late stage beta quench and stress relief anneal), 36 (stress relief anneal) and 38 (recrystallization). A comparison of Curve 34 of FIG. 2B with Curves 30 and 32 of FIG. 2A and Curves 36 and 38 of FIG. 2B shows that a late stage beta quench may be employed with a 82% engineering reduction in area to provide a material having a high creep rate even though relatively high intermediate annealing temperatures are employed.

Figure 4B:
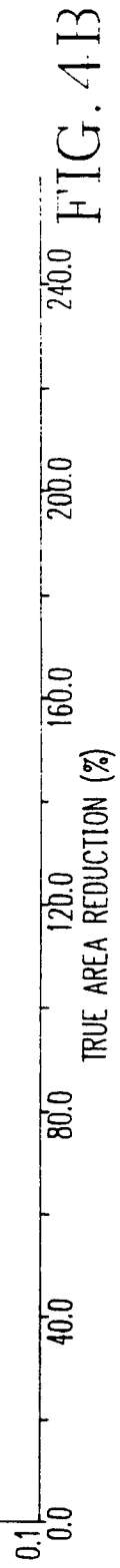
FIG. 4B shows the dependence of the creep rate on final area reduction with curves for beta post extrusion anneals in material both with final stress relief annealing and with final recrystallization annealing.
Figure 8:
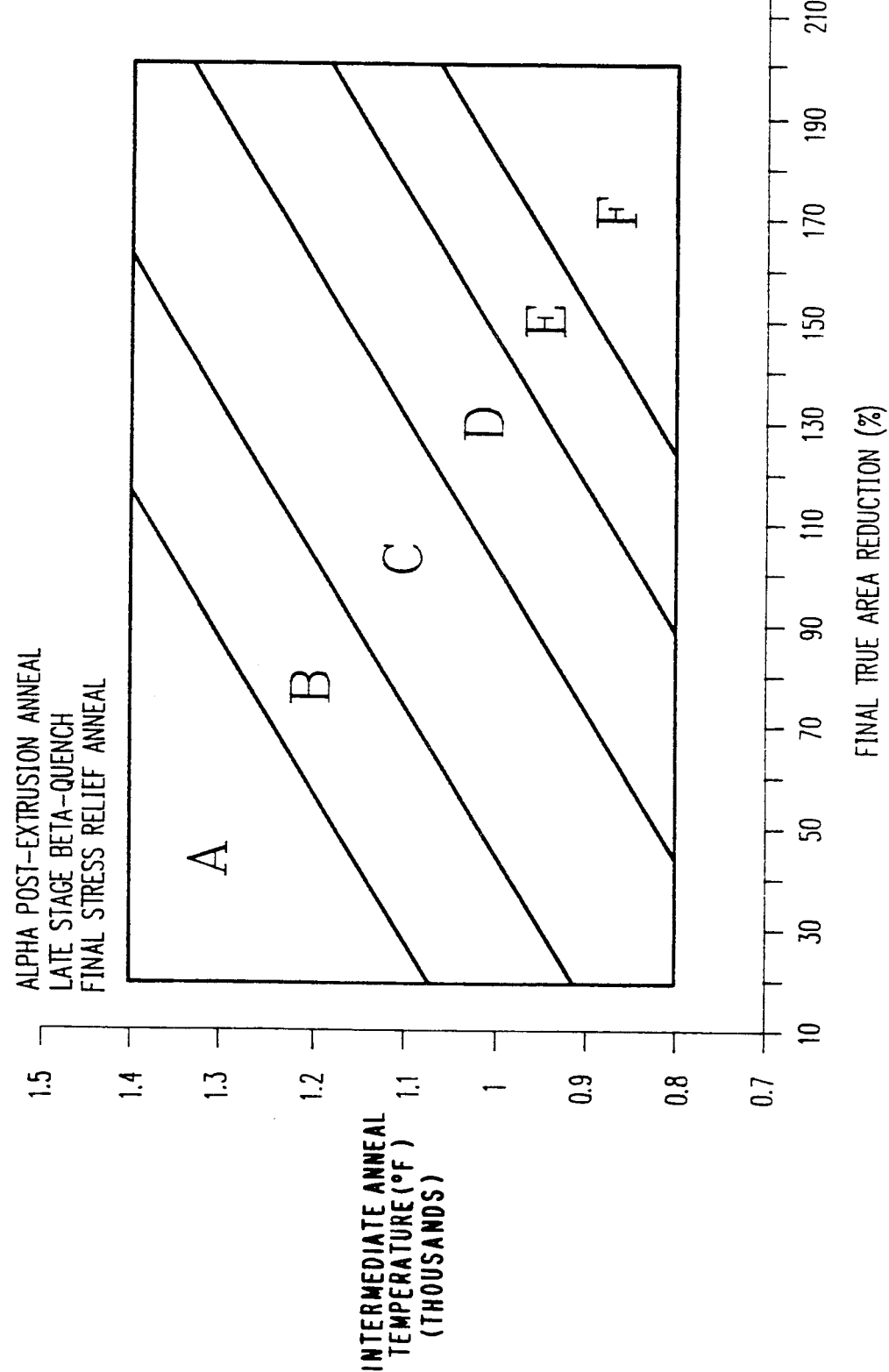

Curves 40-48 of FIG. 3 show the strong effect of final pilger area reduction. In the case of material which was processed with a beta post-extrusion anneal, Curves 42 and 48 show that a decrease in the final engineering area reduction from 82 to 60% (true area reduction of 170 to 109) decreased the secondary rate by a factor of 4.7. The dependence of the secondary creep rate on final area reduction is presented by Curves 52 (stress relief anneal) and 54 (recrystallization) of FIG. 4A and by Curves 56 (stress relief anneal) and 58 (recrystallization) of FIG. 4B. The processes of FIG. 4A include an alpha post extrusion anneal and alpha intermediate anneals. The processes of FIG. 4B include a beta post extrusion anneal and alpha intermediate anneals. A comparison of Curve 54 of FIG. 4A with Curve 52 of FIG. 4A and Curves 56 and 58 of FIG. 4B shows that a process including an alpha post extrusion anneal and alpha intermediate anneals followed by a final recrystallization will provide a material having a creep rate which is independent of the final area reduction over a broad range of about 80% to about 180% true area reduction or more. Advantageously intended or unintended different cold working reductions in the final reduction step of this process produce materials having constant creep rates.

A beta-quench during the late stage of the tubeshell reduction process slightly increases corrosion resistance. Table 1 presents the results for tubing that received a beta-quench by two sizes prior to final size. The beta-quench resulted in a slight reduction in the post-transition corrosion rate. On the other hand, beta-quenching moderately increases thermal creep. Curves 62-68 of FIG. 5 show the effect of beta-quenching when the beta-quench is performed at two reduction steps prior to final size. The increase in thermal creep depends on the intermediate anneal temperature. As Curves 64 and 66 show, in the case of a 1100° F. intermediate anneal temperature, beta-quenching increase the secondary rate by a factor of 1.3. As Curves 62 and 68 show, when the intermediate anneal temperature was increased to 1170° F., beta-quenching increased the secondary rate by a factor of 2.0.

Curves 72-80 of FIG. 6 show the dependence of the creep rate on final heat treatment, including final stress relief annealing (Curves 74, 76), final recrystallization annealing (Curve 82), and final partial recrystallization annealing (Curves 78, 80). As can be seen from the progression of Curves 78-82, the higher the amount of recrystallization, the more creep is reduced.

FIGS. 7 through 14 show areas of thermal creep ranges for combinations of intermediate anneal temperature and final true area reduction with the various figures being related to conditions of post extrusion anneal (alpha or beta), whether of not a late stage beta anneal is utilized, and conditions of final anneal (stress relief, partial recrystallization, or recrystallization). These figures allow the desired amount of creep to be

TABLE 1

| TUBESHELL REDUCTION SIZES | | | |
|---|---|---|---|
| TREX Size: | 2.5 inch OD × 0.43 inch wall | | |
| Final Tube Sizes: | 0.422 inch OD × 0.025 inch wall | | |
| | 0.375 inch OD × 0.023 inch wall | | |
| | 0.360 inch OD × 0.023 inch wall | | |
| Tubeshell Size Sequences (OD × wall-inch) | | | |
| Method | First | Second | Third | Fourth |
|---|---|---|---|---|
| A | 1.12 × 0.25 | 0.65 × 0.075 | — | — |
| B1 | 1.75 × 0.30 | 1.25 × 0.20 | 0.70 × 0.070 | — |
| B2 | 1.75 × 0.30 | 1.00 × 0.18 | 0.61 × 0.070 | — |
| B3 | 1.75 × 0.30 | 1.25 × 0.20 | 0.88 × 0.11 | 0.54 × 0.050 |
| C | 1.56 × 0.29 | 1.125 × 0.16 | 0.625 × 0.70 | — | achieved by adjusting processing variables. It is noted that FIG. 12 has a diamond-shaped region in the C area which reflects the fabrication process of U.S. Pat. No. 4,649,023.

Figure 15:
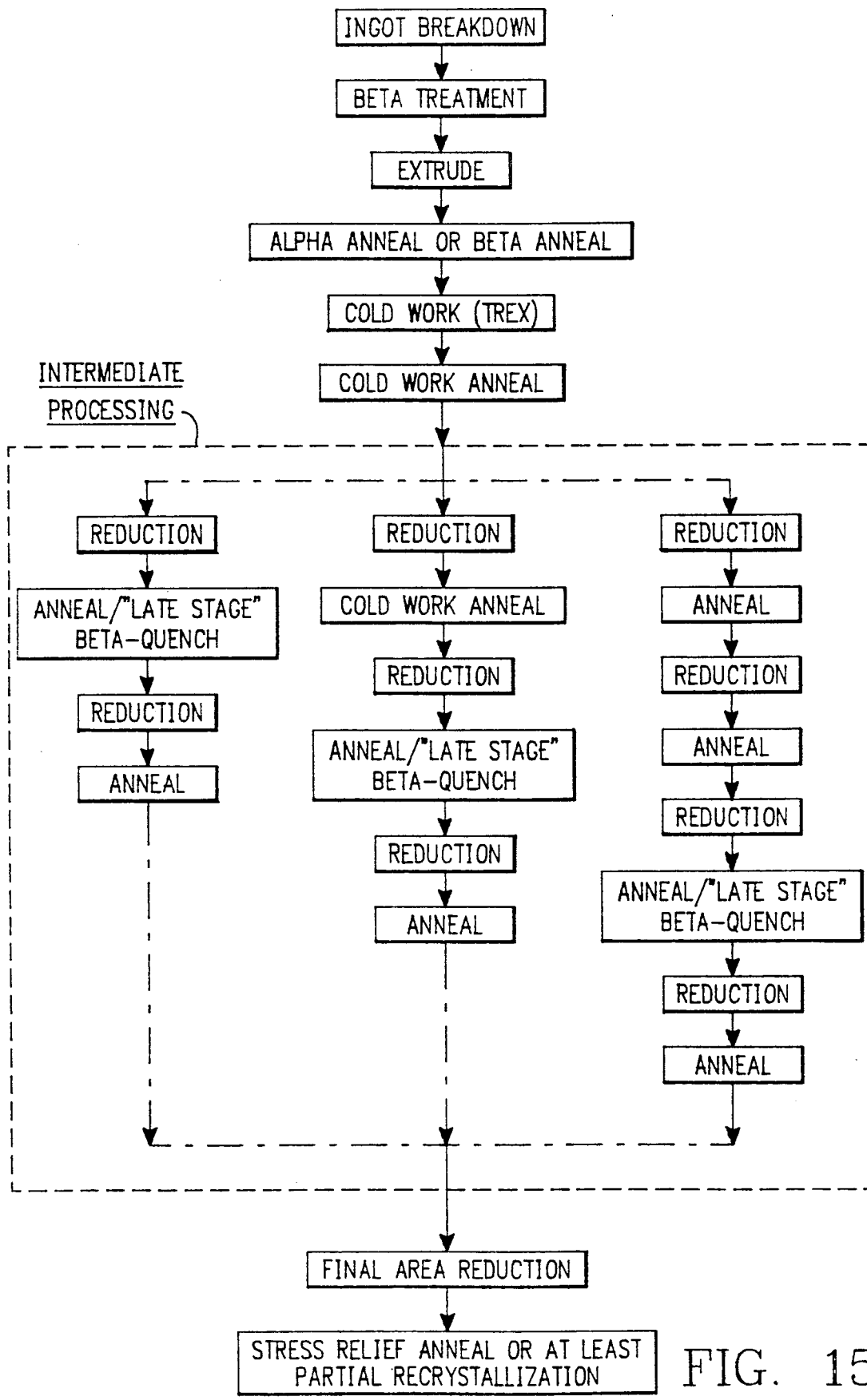
FIG. 15 schematically outlines the processing sequence.

The processing sequence of the invention is schematically outlined in FIG. 15. The current processing starts with a tube reduced extrusion (TREX) which has a 2.5 inch OD and a 0.43 inch wall. The TREX may be reduced to final size tubing by 3, 4 or 5 reductions. Several tubeshell reduction sequences which have been successfully used are listed in Table 1. The extrusion receives a post-extrusion anneal at 1100° F. in the alpha phase region. It has now been found that the intermediate anneal temperature and final pilger area reduction can be selected to produce a material with the desired thermal creep properties.

The thermal creep may be controlled by the final pilger area reduction and intermediate anneal temperature. The method consists of first selecting the desired thermal creep behavior and the conditions of post extrusion anneal (alpha or beta), whether of not a late stage beta anneal is utilized, and conditions of final anneal (stress relief, partial recrystallization, or recrystallization). Then using the appropriate figure one can determine the area reduction and intermediate anneal temperature to achieve the desired creep. Processing methods to produce tubing with a thermal creep secondary rate of $1.66-1.70 \times 10^{-5}$/h will be used to illustrate the fabrication processing method.

An example of ZIRLO material with a low thermal creep secondary rate (fabricated to be inserted into one demonstration assembly currently running in a reactor) is one with a secondary rate of $1.66-1.70 \times 10 \times 5$/h. Three different methods of producing ZIRLO material with a secondary creep rate of $1.66-1.70 \times 10 \times 5$/h are listed in Table 2. Method A was used to fabricate the material for this demo. Method B utilizes a 1250° F. intermediate anneal temperature and a 155% true area reduction. Method C utilizes a 1300° F. intermediate anneal temperature and a 170% true area reduction. The illustration presented in Table 2 was for ZIRLO material that did not receive a late stage beta-quench during the tubeshell reduction process. A slight improvement in corrosion resistance may be obtained by performing a beta-quench on the tubeshell during the late stage of the reduction process. However, the thermal creep secondary rate is moderately increased by late stage beta-quenching. A decrease in the area reduction and/or an increase in the intermediate anneal temperature relative to the values presented in Table 2 can be used to fabricate late stage beta-quenched ZIRLO with a thermal creep of $1.66-1.70 \times 10 \times 5$/h.

TABLE 2

| | PROCESSING PARAMETERS TO FABRICATE ZIRLO TUBING WITH A THERMAL CREEP SECONDARY RATE $1.66 - 1.70 \times 10^{-5}$/h | |
|---|---|---|
| Method | Intermediate Anneal Temperature (°F.) | Final Pilger True Area Reduction (%) |
| A | 1100 | 109 |
| B | 1250 | 155 |
| C | 1300 | 170 |

Thus, returning to FIGS. 7 through 14, this is a method for processing a zirconium alloy material of the type wherein the material is subjected to a post extrusion anneal, a series of an intermediate area reductions and intermediate recrystallization anneals, with one of the intermediate recrystallization anneals possibly being a late stage beta-quench, and a final anneal. The invention comprises controlling creep rate in an alloy having, by weight percent, 0.5-2.0 niobium, 0.7-1.5 tin, 0.07-0.28 of at least one of iron, nickel and chromium and up to 220 ppm carbon, and the balance essentially zirconium. This can be done, for example, by subjecting the material to an alpha post extrusion anneal and a final stress relief anneal, and not using a late stage beta-quench, and controlling the creep rate to about 0.000,001-0.000,004 per hour by the use of an average intermediate recrystallization annealing temperature and a final true area reduction combination selected from area A of FIG. 7; or controlling the creep rate to about 0.000,004-0.000,010 per hour by the use of an average intermediate recrystallization annealing temperature and a final true area reduction combination selected from area B of FIG. 7; or controlling the creep rate to about 0.000,010-0.000,030 per hour by the use of an average intermediate recrystallization annealing temperature and a final true area reduction combination selected from area C of FIG. 7; or controlling the creep rate to about 0.000,030-0.000,070 per hour by the use of an average intermediate recrystallization annealing temperature and a final true area reduction combination selected from D area of FIG. 7; or controlling the creep rate to about 0.000,070-0.000,140 per hour by the use of an average intermediate recrystallization annealing temperature and a final true area reduction combination selected from area E of FIG. 7; or controlling the creep rate to about 0.000,140-0.000,200 per hour by the use of an average intermediate recrystallization annealing temperature and a final true area reduction combination selected from area F of FIG. 7; or similarly by subjecting the material to an alpha post extrusion anneal and a final stress relief anneal, and using a late stage beta-quench, and controlling the creep rate to about 0.000,001-0.000,004 per hour by the use of an average intermediate recrystallization annealing temperature and a final true area reduction combination selected from area A of FIG. 8; or controlling the creep rate to about 0.000,004-0.000,010 per hour by the use of an average intermediate recrystallization annealing temperature and a final true area reduction combination selected from area B of FIG. 8; or controlling the creep rate to about 0.000,010-0.000,030 per hour by the use of an average intermediate recrystallization annealing temperature and a final true area reduction combination selected from area C of FIG. 8; or controlling the creep rate to about 0.000,030-0.000,070 per hour by the use of an average intermediate recrystallization annealing temperature and a final true area reduction combination selected from area D of FIG. 8; or controlling the creep rate to about 0.000,070-0.000,140 per hour by the use of an average intermediate recrystallization annealing temperature and a final true area reduction combination selected from area E of FIG. 8; or controlling the creep rate to about 0.000,140-0.000,200 per hour by the use of an average intermediate recrystallization annealing temperature and a final true area reduction combination selected from area F of FIG. 8; or similarly by subjecting the material to an alpha post extrusion anneal and a final at least partially recrystallizing anneal, and not using a late stage beta-quench, and controlling the adjusted creep rate to about 0.000,001-0.000,004 per hour by the use of an average intermediate recrystallization annealing temperature and a final true area reduction combination selected from area A of FIG. 9; or controlling the creep rate to about 0.000,004-0.000,010 per hour by the use of an average intermediate recrystallization annealing temperature and a final true area reduction combination selected from area B of FIG. 9; or similarly by subjecting the material to an alpha post extrusion anneal and a final at least partial recrystallization anneal, and using a late stage beta-quench, and controlling the adjusted creep rate to about 0.000,001-0.000,004 per hour by the use of an average intermediate recrystallization annealing temperature and a final true area reduction combination selected from area A of FIG. 10; or controlling the creep rate to about 0.000,004-0.000,010 per hour by the use of an average intermediate recrystallization annealing temperature and a final true area reduction combination selected from area B of FIG. 10; or controlling the creep rate to about 0.000,010-0.000,030 per hour by the use of an average intermediate recrystallization annealing temperature and a final true area reduction combination selected from area C of FIG. 10. While other combinations using a beta post extrusion anneal, as previously described, can also be used, the alpha post anneal conditions, as described in this paragraph, are preferred.

Similarly, subjecting the material to an alpha post extrusion anneal and a final stress relief anneal, and not using a late stage beta-quench, allows controlling the creep rate from about 0.000,045 to about 0.000,065 per hour by the use of an average intermediate recrystallization annealing temperature of about 1100° F. and a final true area reduction of about 170 percent. See, e.g., FIG. 7.

Alternately, the material may be subjected to an alpha post extrusion anneal and a final stress relief anneal, without a late stage beta-quench, and the creep rate controlled from about 0.000,030 to about 0.000,040 per hour by the use of an average intermediate recrystallization annealing temperature of about 1100° C. and a final true area reduction of about 158 percent. See, e.g., FIG. 7.

Figure 9:
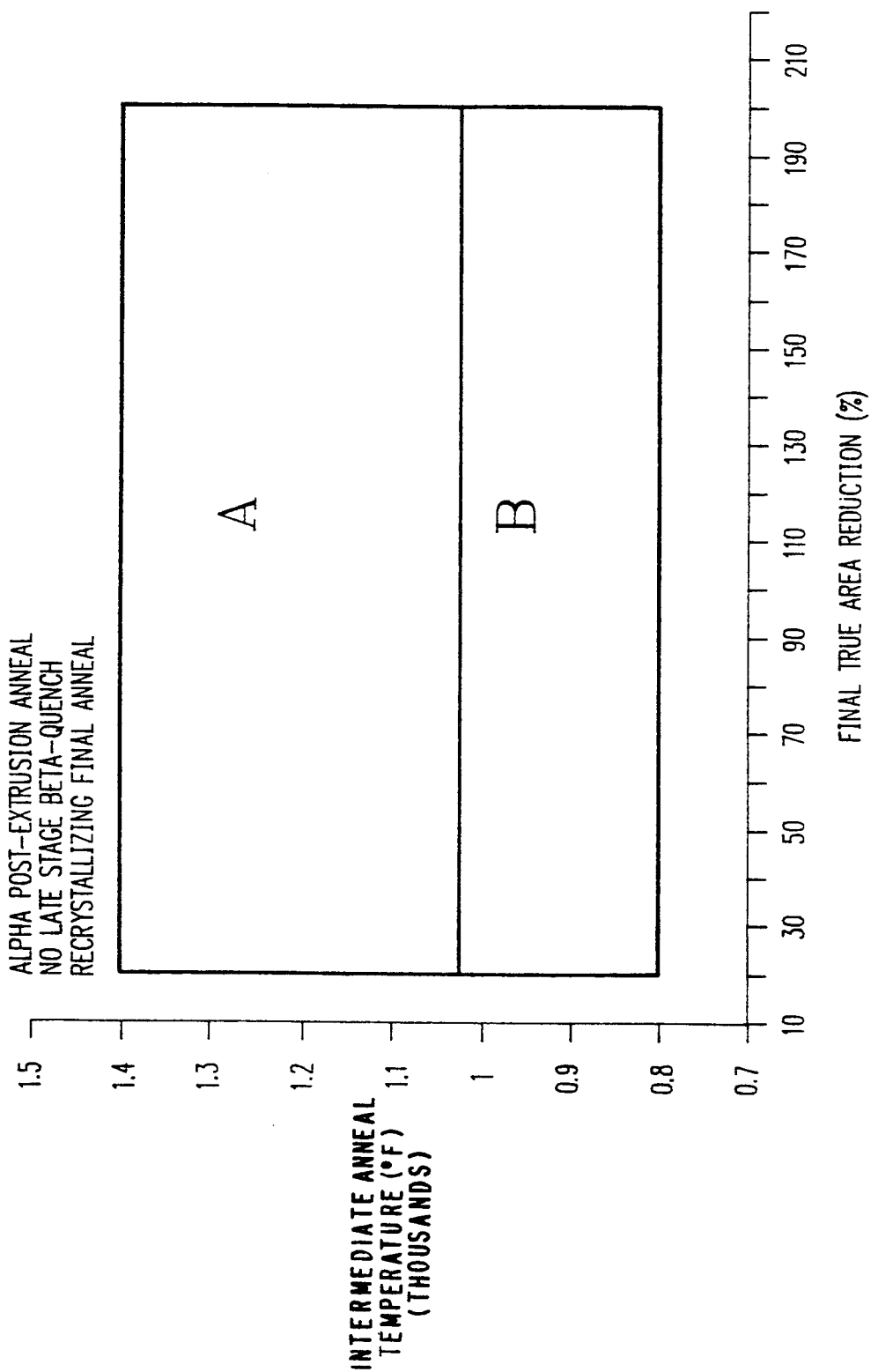
Figure 10:
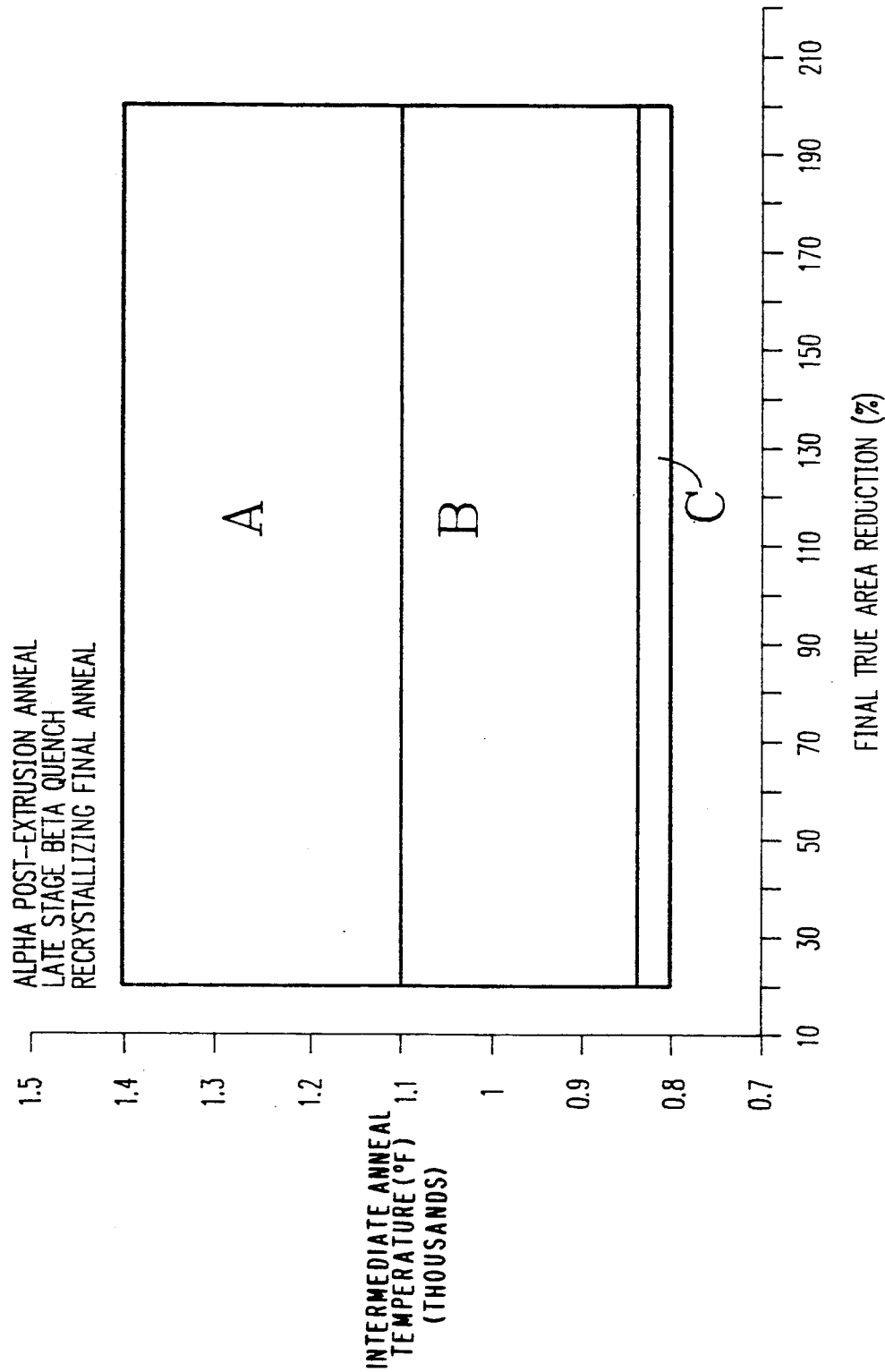
Figure 11:
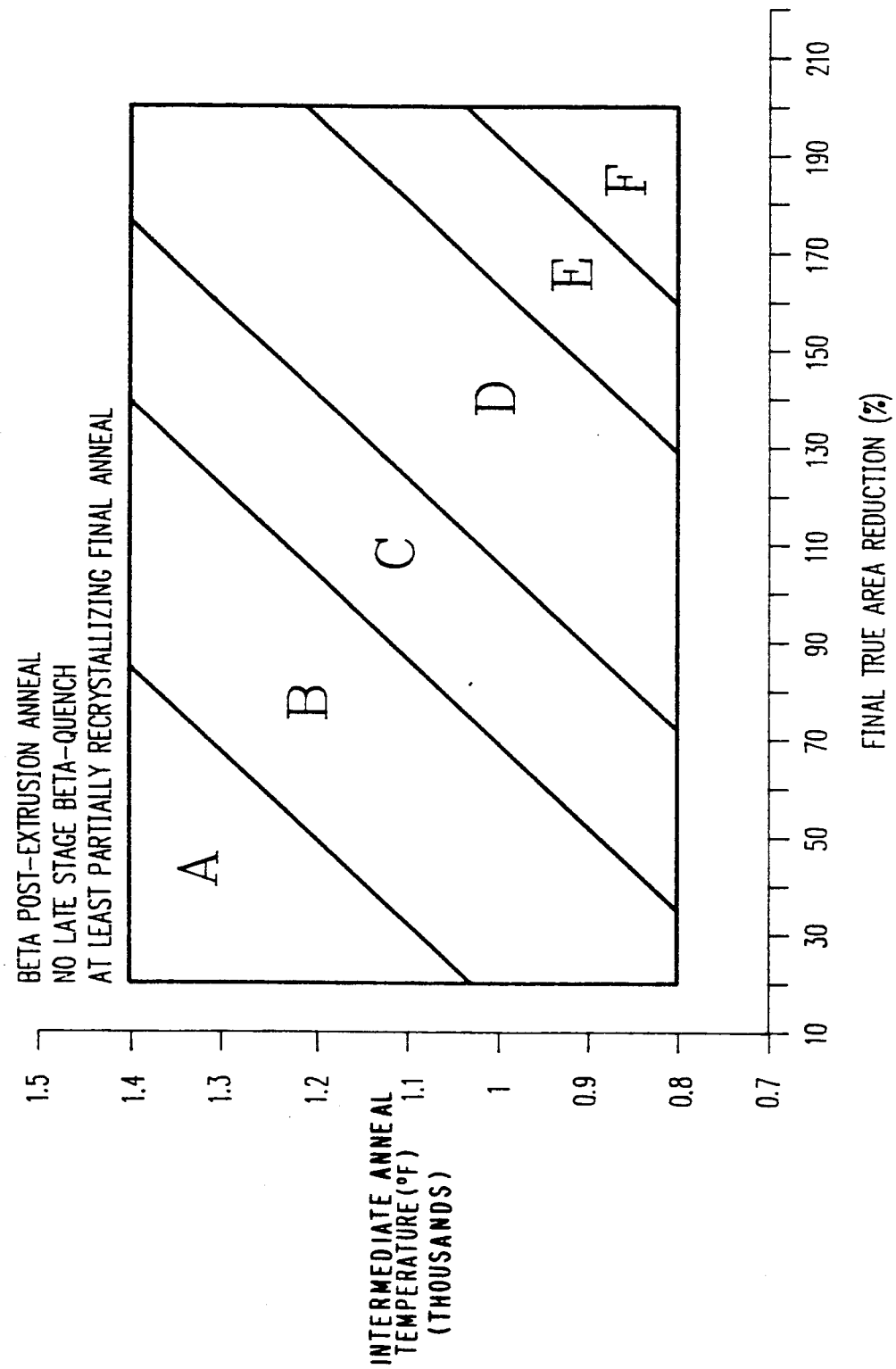
Figure 12:
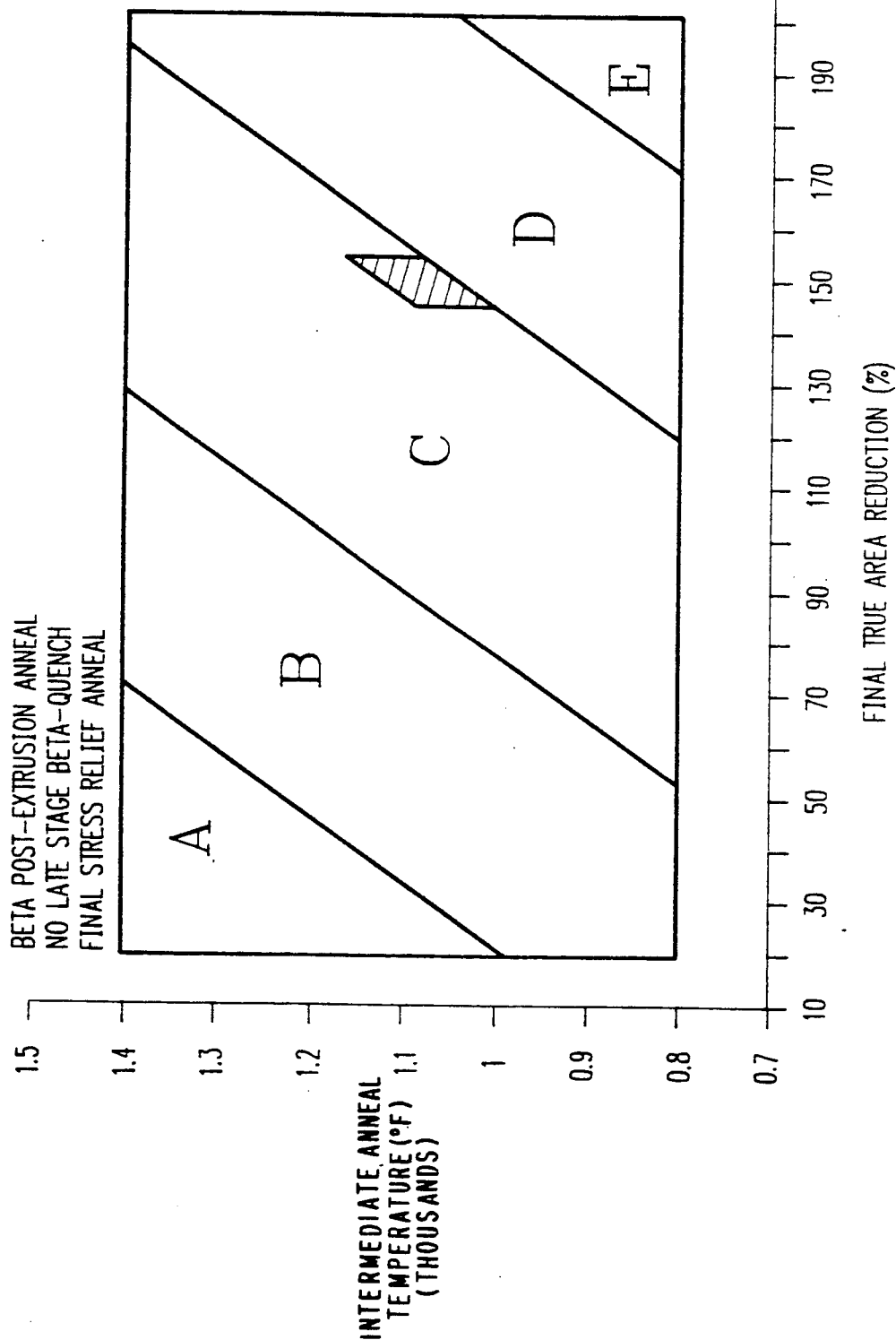
Figure 13:
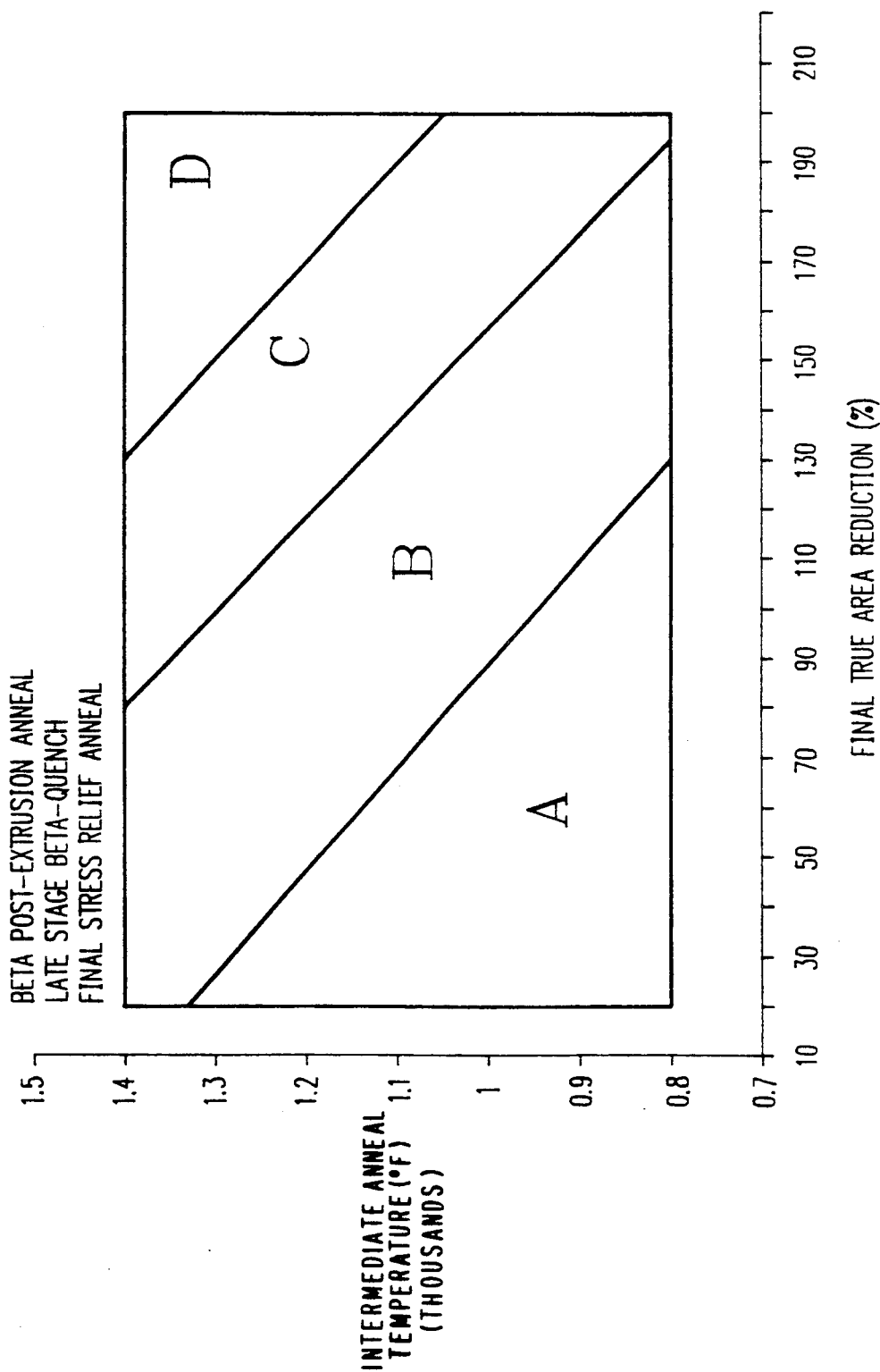
Figure 14:
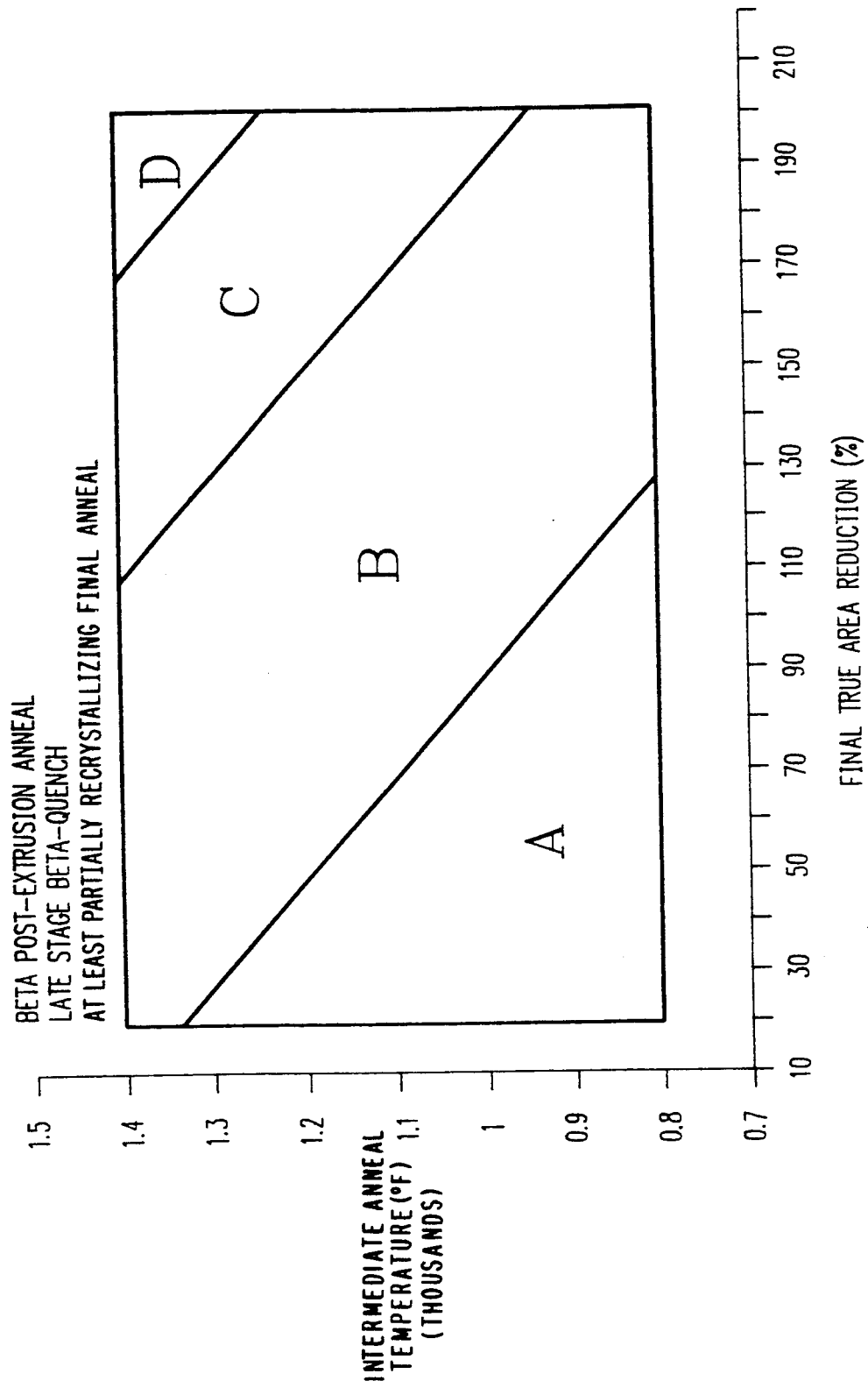

The practices reflected by FIGS. 9 and 10 advantageously provide material having a constant creep rate over a very broad working range. The practice of FIG. 9 generally includes the steps of annealing the extrusion (and preferably alpha annealing the extrusion), working the extrusion in a plurality of area reduction steps, intermediately annealing the reduced extrusion after the intermediate working steps, finally working the reduced extrusion and then recrystallizing the finally worked material. The practice of FIG. 10 adds the step of beta quenching after a late stage intermediate working step. Tubes, strips and other components of nuclear reactor assemblies processed in accordance with the practices of FIGS. 9 and 10 advantageously have constant creep rates. Thus, these materials may be processed in fewer steps (and at lower costs) employing larger area reductions without affecting their creep rates so long as cold working conditions continue. In addition, an assembly of components processed in accordance with the practices of FIGS. 9 and 10 can be designed such that several of the components will have substantially the same creep rate. Thus, e.g., tubes, tubesheets and spacers may be designed to have the same creep rate.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. In a method for processing a zirconium alloy, material of the type wherein the material is subjected to a post extrusion anneal, a series of an intermediate area reductions and intermediate recrystallization anneals, with one of the intermediate recrystallization anneals possibly being a late stage beta-quench, a final area reduction, and a final anneal; the improvement comprising controlling creep rate in an alloy consisting essentially of by weight percent, 0.5-2.0 niobium, 0.7-1.5 tin, 0.07-0.28 of at least one of iron, nickel and chromium and up to 220 ppm carbon, and the balance essentially zirconium by:
 a) subjecting the material to an alpha post extrusion anneal and a final stress relief anneal, and not using a late stage beta-quench, and controlling the creep rate to about 0.000,001-0.000,004 per hour by the use of an average intermediate recrystallization annealing temperature and a final true area reduction combination selected from area A of FIG. 7; or controlling the creep rate to about 0.000,004-0.000,010 per hour by the use of an average intermediate recrystallization annealing temperature and a final true area reduction combination selected from area B of FIG. 7; or controlling the creep rate to about 0.000,010-0.000,030 per hour by the use of an average intermediate recrystallization annealing temperature and a final true area reduction combination selected from area C of FIG. 7; or controlling the creep rate to about 0.000,030-0.000,070 per hour by the use of an average intermediate recrystallization annealing temperature and a final true area reduction combination selected from D area of FIG. 7; or controlling the creep rate to about 0.000,070-0.000,140 per hour by the use of an average intermediate recrystallization annealing temperature and a final true area reduction combination selected from area E of FIG. 7, or controlling the creep rate to about 0.000,140-0.000,200 per hour by the use of an average intermediate recrystallization annealing temperature and a final true area reduction combination selected from area F of FIG. 7; or
 b) subjecting the material to an alpha post extrusion anneal and a final stress relief anneal, and using a late stage beta-quench, and controlling the creep rate to about 0.000,001-0.000,004 per hour by the use of an average intermediate recrystallization annealing temperature and a final true area reduction combination selected from area A of FIG. 8; or controlling the creep rate to about 0.000,004-0.000,010 per hour by the use of an average intermediate recrystallization annealing temperature and a final true area reduction combination selected from area B of FIG. 8; or controlling the creep rate to about 0.000,010-0.000,030 per hour by the use of an average intermediate recrystallization annealing temperature and a final true area reduction combination selected from area C of FIG. 8; or controlling the creep rate to about 0.000,030–0.000,070 per hour by the use of an average intermediate recrystallization annealing temperature and a final true area reduction combination selected from area D of FIG. 8; or controlling the creep rate to about 0.000,070–0.000,140 per hour by the use of an average intermediate recrystallization annealing temperature and a final true area reduction combination selected from area E of FIG. 8; or controlling the creep rate to about 0.000,140–0.000,200 per hour by the use of an average intermediate recrystallization annealing temperature and a final true area reduction combination selected from area F of FIG. 8; or c) subjecting the material to an alpha post extrusion anneal and a final at least partial recrystallization anneal, and not using a late stage beta-quench, and controlling the adjusted creep rate to about 0.000,001–0.000,004 per hour by the use of an average intermediate recrystallization annealing temperature and a final true area reduction combination selected from area A of FIG. 9; or controlling the creep rate to about 0.000,004–0.000,010 per hour by the use of an average intermediate recrystallization annealing temperature and a final true area reduction combination selected from area B of FIG. 9; or d) subjecting the material to an alpha post extrusion anneal and a final at least partial recrystallization anneal, and using a late stage beta-quench, and controlling the adjusted creep rate to about 0.000,001–0.000,004 per hour by the use of an average intermediate recrystallization annealing temperature and a final true area reduction combination selected from area A of FIG. 10; or controlling the creep rate to about 0.000,004–0.000,010 per hour by the use of an average intermediate recrystallization annealing temperature and a final true area reduction combination selected from area B of FIG. 10; or controlling the creep rate to about 0.000,010–0.000,030 per hour by the use of an average intermediate recrystallization annealing temperature and a final true area reduction combination selected from area C of FIG. 10; or e) subjecting the material to a beta post extrusion anneal and a final at least partial recrystallization anneal, and not using a late stage beta-quench and controlling the adjusted creep rate to about 0.000,000,04–0.000,000,1 per hour by the use of an average intermediate recrystallization annealing temperature and a final true area reduction combination selected from area A of FIG. 11; or controlling the creep rate to about 0.000,000,1–0.000,000,4 per hour by the use of an average intermediate recrystallization annealing temperature and a final true area reduction combination selected from area B of FIG. 11; or controlling the adjusted creep rate to about 0.000,000,4–0.000,001 per hour by the use of an average intermediate recrystallization annealing temperature and a final true area reduction combination selected from area C of FIG. 11; or controlling the creep rate to about 0.000,001–0.000,004 per hour by the use of an average intermediate recrystallization annealing temperature and a final true area reduction combination selected from area D of FIG. 11; or controlling the creep rate to about 0.000,004–0.000,010 per hour by the use of an average intermediate recrystallization annealing temperature and a final true area reduction combination selected from area E of FIG. 11; or controlling the creep rate to about 0.000,010–0.000,030 per hour by the use of an average intermediate recrystallization annealing temperature and a final true area reduction combination selected from area F of FIG. 11; or f) subjecting the material to a beta post extrusion anneal and a final stress relief anneal, and not using a late stage beta-quench and controlling the adjusted creep rate to about 0.000,001–0.000,004 per hour by the use of an average intermediate recrystallization annealing temperature and a final true area reduction combination selected from area A of FIG. 12; or controlling the creep rate to about 0.000,004–0.000,010 per hour by the use of an average intermediate recrystallization annealing temperature and a final true area reduction combination selected from area B of FIG. 12; or controlling the creep rate to about 0.000,010–0.000,030 per hour by the use of an average intermediate recrystallization annealing temperature and a final true area reduction combination selected from area C of FIG. 12; or controlling the creep rate to about 0.000,030–0.000,070 per hour by the use of an average intermediate recrystallization annealing temperature and a final true area reduction combination selected from area D of FIG. 12; or controlling the creep rate to about 0.000,070–0.000,140 per hour by the use of an average intermediate recrystallization annealing temperature and a final true area reduction combination selected from area E of FIG. 12; or g) subjecting the material to a beta post extrusion anneal and a final stress relief anneal, and using a late stage beta-quench, and controlling the creep rate to about 0.000,004–0.000,010 per hour by the use of an average intermediate recrystallization annealing temperature and a final true area reduction combination selected from area A of FIG. 13; or controlling the creep rate to about 0.000,010–0.000,030 per hour by the use of an average intermediate recrystallization annealing temperature and a final true area reduction combination selected from area B of FIG. 13; or controlling the creep rate to about 0.000,030–0.000,070 per hour by the use of an average intermediate recrystallization annealing temperature and a final true area reduction combination selected from area C of FIG. 13; or controlling the creep rate to about 0.000,070–0.000,140 per hour by the use of an average intermediate recrystallization annealing temperature and a final true area reduction combination selected from area D of FIG. 13; or h) subjecting the material to a beta post extrusion anneal and a final at least partial recrystallization anneal, and using a late stage beta-quench and controlling the adjusted creep rate to about 0.000,000,4–0.000,001 per hour by the use of an average intermediate recrystallization annealing temperature and a final true area reduction combination selected from area A of FIG. 14; or controlling the creep rate to about 0.000,001–0.000,004 per hour by the use of an average intermediate recrystallization annealing temperature and a final true area reduction combination selected from area B of FIG. 14; or controlling the adjusted creep rate to about 0.000,004–0.000,010 per hour by the use of an average intermediate recrystallization annealing temperature and a final true area reduction combination selected from area C of FIG. 14; or controlling the creep rate to about 0.000,010–0.000,030 per hour by the use of an average intermediate recrystallization annealing temperature and a final true area reduction combination selected from area D of FIG. 14.

2. The method of claim 1, wherein the material is subjected to an alpha post extrusion anneal and a final stress relief anneal, and not using a late stage beta-quench, controlling the creep rate to about 0.000,045–0.000,065 per hour by the use of an average intermediate recrystallization annealing temperature of about 1100° F. and a final true area reduction of about 170 percent.

3. The method of claim 1, wherein the material is subjected to an alpha post extrusion anneal and a final stress relief anneal, and a late stage beta-quench, and the creep rate is controlled to about 0.000,030–0.000,040 per hour by the use of an average intermediate recrystallization annealing temperature of about 1100° C. and a final true area reduction of about 158 percent.

4. A method of producing a zirconium alloy workpiece having a constant creep rate at 385° C. (725° F.), comprising the steps of:

extruding a workpiece consisting essentially of a composition of, by weight percent, 0.5 to 2.0% niobium, 0.7 to 1.5% tin, 0.07 to 0.28% of at least one of iron, nickel, and chromium, up to 220 ppm carbon, balance essentially zirconium;

annealing the extruded workpiece;

intermediately working the annealed extruded workpiece by reducing its cross-sectional area in a plurality of intermediate working steps;

annealing the intermediately worked workpiece after the intermediate working steps;

finally working the workpiece by reducing its cross-sectional area; and recrystallizing the finally worked workpiece.

5. The method of claim 4, wherein the extruded workpiece is given an alpha post extrusion anneal.

6. The method of claim 4, comprising the additional step of beta quenching the intermediately worked workpiece after a late stage intermediate working step.

7. The method of claim 4, including the step of reducing the cross sectional area of the workpiece in the final working step by 10–190% true area reduction.

8. The method of claim 7, including the step of reducing the cross-sectional area of the workpiece in the final working step by 80–180% true area reduction.

9. The method of claim 7, including the step of reducing the cross-sectional area of the workpiece in the final working step by 90–170% true area reduction.

* * * * *